Oct. 3, 1967

A. C. LEENHOUTS

DECIMAL CODED BINARY COUNTER WITH SEQUENTIAL DIGIT INPUT 3,345,521

Filed Feb. 17, 1966

2 Sheets-Sheet 1

INVENTOR.
Albert C. Leenhouts
BY
Johnson and Kline
ATTORNEYS

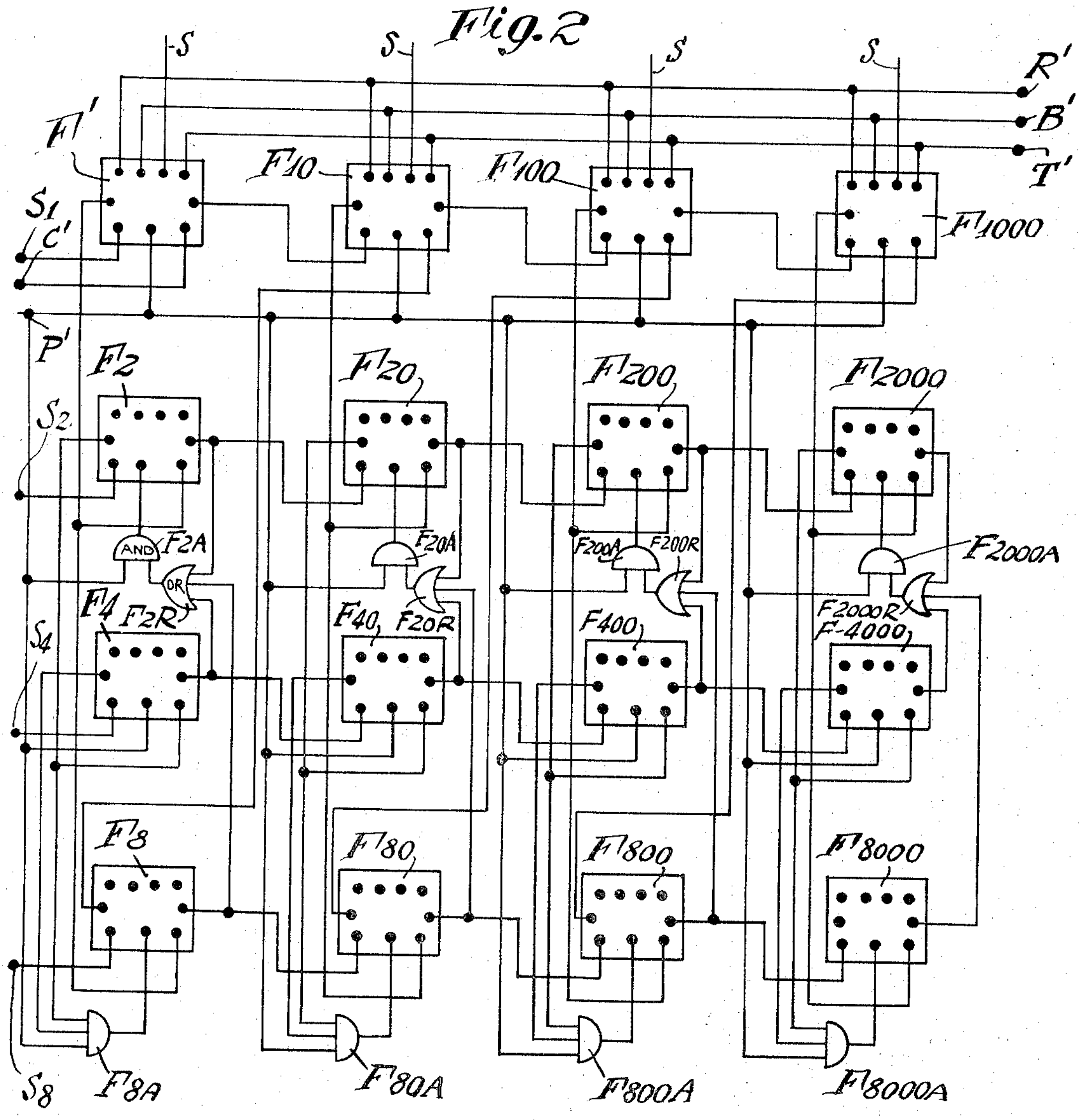
Fig. 3
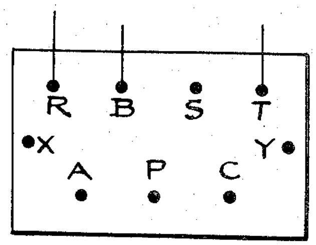
INVENTOR.
Albert C. Leenhouts
BY
Johnson and Kline
ATTORNEYS 3,345,521

DECIMAL CODED BINARY COUNTER WITH SEQUENTIAL DIGIT INPUT

Albert C. Leenhouts, Granby, Conn., assignor to The Superior Electric Company, Bristol, Conn., a corporation of Connecticut Filed Feb. 17, 1966, Ser. No. 528,151
10 Claims. (Cl. 307—88.5)

ABSTRACT OF THE DISCLOSURE

A logic circuit having at least two binary coded decades which initially function as a shift register to store a plural digit decimal number and then upon command function as a counter to count by changing its condition one digit for each unitary pulse supplied thereto.

In many applications involving digital control of electrical equipment, the movement of the equipment is controlled by individual output pulses with the desired extent of movement being equatable to a decimal number of output pulses. The number may be stored on a card or tape in conventional binary code for use in a decimal coded binary counter. When it is desired to supply the number of pulses the counter is caused to assume a binary condition representative of the decimal number. When each output pulse is supplied, the binary counter counts one decimal unit, i.e. changes its condition to a binary condition which is representative of one less unit than previsously until it reaches, if a down counter, a zero condition. The zero condition occurs after the decimal number of output pulses that has been supplied equals the decimal number representative of the condition to which the binary counter was initially set.

It will be appreciated that heretofore two different logic circuits were accordingly required in order to perform each function. One circuit would be a plural decade shift register that was caused to assume the binary condition representative of the decimal number, such as a four digit number, as the number was read. digit by digit, from a tape. After having assumed the condition, all decade conditions were transferred substantially simultaneously to a decimal coded binary counter which was thus caused to assume the same condition as the shift register. When output pulses appeared, the counter counted by subtracting the pulses. Thus while the counter was operating, the shift register was idle and generally while the shift register was operating the counter was idle. Thus two essentially similar circuits were required with each only performing its own specific function.

It is accordingly an object of the present invention to provide a logic circuit which may be selectively controlled to operate as a shift register for assuming a binary condition representative of a plural digit decimal number and subsequently caused to function as a decimal coded binary counter.

Another object of the present invention is to provide a bistable flip-flop circuit that is capable of receiving and giving signals and caused to function as if interconnected to be a shift register or a binary counter.

A further object of the present invention is to achieve the above objects with a logic circuit that is composed of extremely few parts for the functions performed, in which these parts may be easily grouped and in which there are only few interconnections between the groups.

A feature of the present invention resides in the utilization of a plurality of identical bistable flip-flop circuits that are logically interconnected to function as either a down counter or a shift register. Each of the flip-flop circuits has a pair of transistors with each transistor having a trigger point and an output sense point and with alternate points of each being interconnected. The flip-flop is capable of being actuated to change its state by the application of a signal to its trigger points and thus may be controlled to either assume either one of its two states, retain its present state or, irrespective of its present state, to shift to its other state. When functioning as a shift register and being caused to assume a definite state, signals consisting of a constant potential which determines the state and a pulse are applied to a pair of terminals causing the flip-flop to assume one state for one value of the constant potential and the other state for another value of the constant potential, irrespective of its present state. The value of the constant potential alone will not affect the flip-flop.

When it is desired to have the flip-flop circuit function as a binary counter, there is also provided another pair of terminals to which signals, consisting of a high value of potential and a pulse, are applied. To cause a change in the state of the flip-flop both must simultaneously occur. Neither by itself is capable of effecting a change of state of the flip-flop.

A further feature of the present invention resides in interconnecting the flip-flops to cause them to function as a plural decade down counter or a plural decade shift register. In the specific embodiment shown there are four decades, so that the circuit is capable of controlling a number of pulses of not more than four decimal digits. Each decades has interconnections which cause it to function as a decimal coded binary counter with the passage of pulses being controlled by AND and OR gates. When functioning as a shift register, the state of the previous decade or input to the first decade controls the value of the constant potential and thus when a trigger pulse is applied to all flip-flops, the change will depend on the value of the constant potential at the preceding decade flip-flop.

An additional feature resides in each of the flip-flop circuits having a common terminal that enables one signal to be applied to all of them to reset all the flip-flops to the same condition and another common terminal that provides a signal whenever a zero count condition is achieved. Also, if desired, rather than utilize the decimal, digit by digit, sequential input of the present invention, each of the flip-flops is capable of being set by a manual input thereto as from a switch arrangement which is settable to a decimal number but coded in binary code to cause the flip-flops to assume a binary condition representative of the decimal number.

Other features and advantages will hereinafter appear.

In the drawing:

FIG. 2 is a logic diagram showing the interconnections of a plurality of flip-flops to cause them to function as either a binary coded down counter or a shift register.

FIG. 3 is a block diagram of one of the flip-flop circuits as they are depicted in the logic circuit of FIG. 2.

Figure 1:
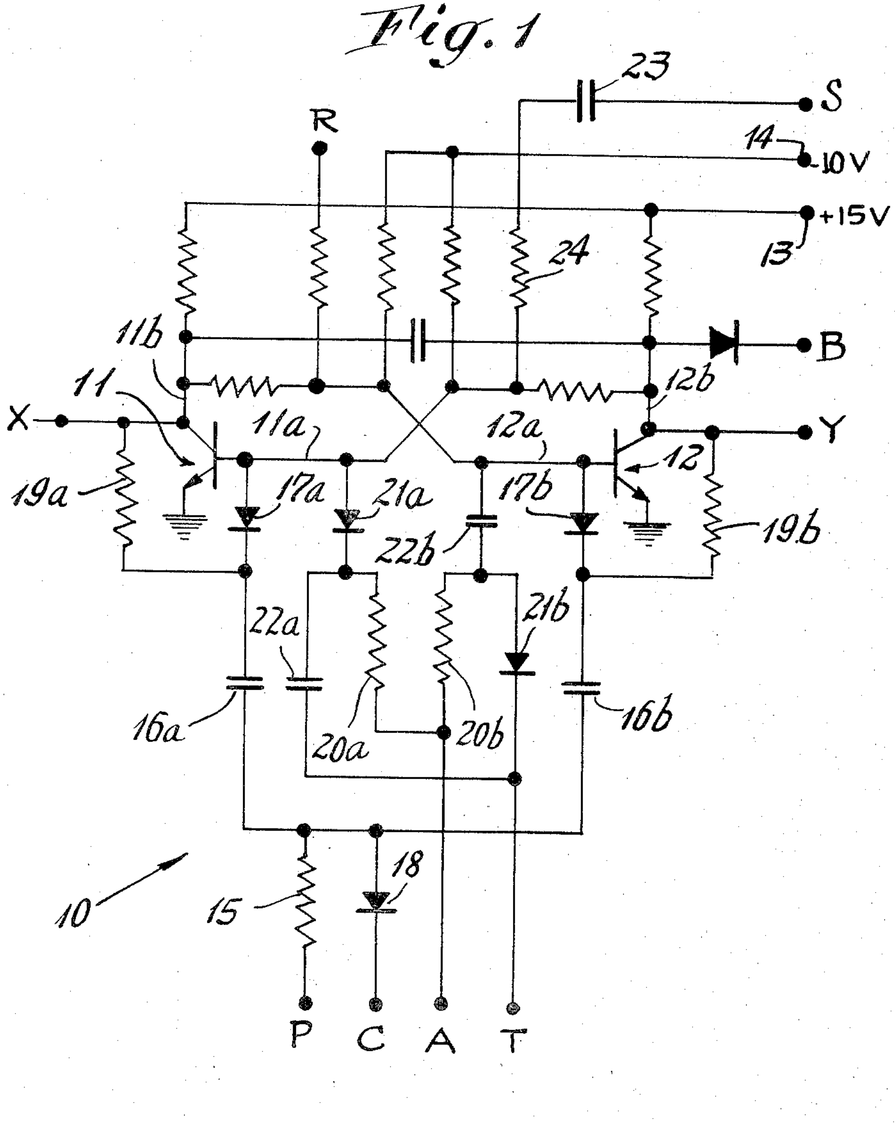
FIGURE 1 is an electrical schematic diagram of a flip-flop circuit utilized in the present invention.

Referring to the drawing (FIG. 1), the flip-flop is generally indicated by the reference numeral 10 and includes a pair of transistors 11 and 12. The collectors of transistors are connected to a +15 volt supply at a terminal 13 while their emitters are connected to ground. A negative potential, as for example −10 volts is applied at a terminal 14. The bases of each of the transistors 11 and 12 constitute the trigger point for each and are denoted 11*a* and 12*b* respectively while the collectors 11*b* and 12*b* constitute the sense point for each for providing a voltage indicative of the condition of the flip-flop. As is usual in a bistable flip-flop, the sense point 12*b* is connected to the trigger point 11*a* and the sense point 11*b* is connected to the trigger point 12*a*. The sense point 11*b* has an output terminal denoted X while the sense point 12*b* has an output terminal denoted Y. It will be appreciated that the point X is of low positive potential and the point Y is of high positive potential when the transistor 11 conducts while the opposite occurs when the transistor 12 conducts. When one point is high the other point is low and thus neither sense point will have the same quiescent potential.

As employed hereinafter, the state of the flip-flop 10 is denoted "0" when the transistor 12 conducts and is denoted "1" when the transistor 11 conducts. When its state is changed from 0 to 1, a negative pulse, i.e. a high to low positive voltage change occurs at the point X while with a change in state from 1 to 0 a similar negative pulse occurs at the point Y. The flip-flop is made to be responsive to only negative pulses applied at its trigger points and its state will change only when the negative pulse is applied to the trigger point of the conducting transistor, causing it to cease conduction.

The flip-flop 10 has a count command terminal P and a count pulse terminal C to which signals are applied when the flip-flop is used as a binary counter. When a negative pulse on the terminal C occurs simultaneously with a high potential on terminal P, the flip-flop will change its state. It will not change for any other combination of high and low potentials or pulses on the terminals P and C. The terminal P is connected through a resistance 15 to parallel paths with one path having a condenser 16*a*, a diode 17*a* and being connected to the trigger point 11*a* and the other path having a condenser 16*b* and diode 17*b* connected to the trigger point 12*a*. The point P has a high positive potential thereon whenever the flip-flop circuit 10 is to function as a counter.

The terminal C is connected through the cathode of a diode 18 to the condensers 16*a* and 16*b* and hence through the diodes 17*a* and 17*b* to their respective trigger points 11*a* and 12*a*.

When during the count command, i.e. binary counter function, both the points P and C are plus, i.e. have a high positive potential, the flip-flop will not change state irrespective of its state as a negative pulse is not applied to the trigger point of the conducting transistor. For the condition when P is plus and a negative pulse appears on the count terminal C, current may flow if the transistor 11 is conducting through the diode 17*a*, condenser 16*a* and diode 18 decreasing the potential at the trigger point 11*a* sufficiently to cause the transistor 11 to cease conduction, whereupon the voltage at its sense point 11*b* increases to cause conduction of the transistor 12 and change the state of the flip-flop.

If, on the other hand, when the transistor 12 is conducting, the terminal P is positive and a negative count pulse appears at the terminal C, current may be conducted through the diode 17*b*, condenser 16*b* and diode 18 to cease conduction of the transistor 12 and cause conduction of the transistor 11.

For preventing the negative pulse from interfering with the transistor which is to be caused to be conducting, a resistance 19*a* is connected between the sense point 11*b* and junction of diode 17*a* and condenser 16*a* and a resistance 19*b* is similarly connected with respect to the transistor 12. In the first condition, i.e. where transistor 11 is conducting and the transistor 12 is then caused to conduct, the resistance 19*a* will provide a low potential at the junction and hence not prevent current flow and potential drop at the trigger point 11*a*. On the other hand the resistance 19*b* places a high positive potential on the junction of the cathode of the diode 17*b* and the condenser 16*b* which prevents current flow through the diode 17*b* and thereby prevents a decrease in voltage at the trigger point 12*a*.

For the other condition where a low positive potential appears on the terminal P, a positive pulse, i.e. a change from a low to a high positive potential on the terminal C, is blocked by the diode 18 as it is back-biased while a negative pulse, i.e. a change from a high positive potential to a low potential at the terminal C is blocked by the diode 18 from changing the state as insufficient voltage exists across the diode to cause conduction therethrough. Thus only the simultaneous occurrence of a high positive voltage on the terminal P and a negative pulse on the terminal C will cause a change in state of the flip-flop from its present state to its other state.

When the flip-flop is employed as a shift register, it is required that it assume a specific state irrespective of its present state and thus may either retain its same state if it is the desired state or change its state to the desired state. The flip-flop 10 has a copy state terminal A which controls the state desired by its potential level and a copy command terminal T at which a negative pulse is applied whenever it is desired to have the flip-flop assume the condition represented by the potential level on the terminal A. When the terminal A is at low positive potential, a negative pulse on the terminal T will cause the flip-flop to assume the 0 state (transistor 12 conducts). When the terminal A is at a high potential, a pulse on the terminal T will cause the flip-flop to assume the 1 state (transistor 11 conducts). The flip-flop will only be affected by the simultaneous application of a hgih or low potential on terminal A and a pulse on terminal T.

Terminal A is connected to a pair of parallelly connected resistors 20*a* and 20*b* with the resistor 20*a* being connected between the junction of a diode 21*a* and a condenser 22*a*, the latter being connected to the terminal T. The resistor 20*b* is connected to the junction of a condenser 22*b* and a diode 21*b* with the cathode of the latter being connected to the terminal T.

Assuming the condition where the terminal A has a high positive potential indicating that the flip-flop should assume the 1 state (transistor 11 conducting), if it is already conducting, then a negative pulse on the terminal T will not change the high potential on the trigger point 11*a* by reason of the high positive potential on terminal A through the resistor 20*a* maintaining a high potential on the cathode of the diode 21*a*. If, however, the transistor 12 is conducting then it is caused to be nonconducting when the negative pulse appears by conduction being permitted through the diode 21*b* which produces a negative pulse at the trigger point 12*a* through the condenser 22*b* causing it to cease conduction. Thus if the terminal A is at high positive potential, the flip-flop will assume the 1 state when the negative pulse appears on the copy command terminal T irrespective of its former state.

When the terminal A is at a low potential, the flip-flop is to assume the 0 state (transistor 12 conducting). If the transistor 12 is already conducting when the pulse occurs on the terminal T, there will be substantially no current flow through the diode 21*b* from the trigger point 12*a* by reason of the diode having insufficient forward voltage to be rendered conducting and thus the same potential is maintained at the trigger point 12*a*. On the other hand, if the transistor 11 is condutcing, the negative pulse at the terminal T will cause conduction through the diode 21*a* to decrease the potential at the trigger point 11*a* to a voltage level which causes transistor 11 to cease conduction and transistor 12 to become conducting.

It will thus be appreciated that the flip-flop will assume either the 0 or 1 state depending upon the potential on the terminal A only when a negative pulse is applied to the trigger terminal T.

In addition to the terminals X, Y, P, C, A and T, the flip-flop includes a terminal B which has substantially the same potential as the terminal Y and is used to provide an output signal when the logic circuit is at the zero count condition as will be more fully explained hereinafter.

When it is desired to set the flip-flop to the 0 state, there is provided a terminal R on which a momentary positive voltage will cause the transistor 12 to conduct to reset the flip-flop to the 0 state.

In order to provide for manual data input so that the flip-flop 10 may be set by other than signals applied to its terminals P, C, A and T to either the 0 or the 1 state, there is provided a terminal S which through a condenser 23 and resistor 24 is connected to the trigger point 11*a*. After the flip-flop has been set to the 0 state by application of a potential at the terminal R, if it is desired to change its state to the 1 state, a positive pulse is applied to the terminal S which causes the transistor 11*a* to start conduction to change the state of the flip-flop. If a potential is not applied, then the flip-flop will remain in the 0 state.

Referring to FIG. 2, there is shown a logic circuit which is capable of assuming a condition representative of a four digit decimal number by sequential entrance of the digits and which, upon comand, is capable of down counting with each pulse from said assumed condition. Upon reaching a zero count condition, a signal will appear. In the specific embodiment shown, a four digit decimal number is the maximum to be controlled by the logic circuit and accordingly there are provided four flip-flops F1, F2, F4 and F8 constituting a first decade. Additional flip-flops F10, F20, F40 and F80 constitute a second decade; flip-flops F100, F200, F400 and F800 constitute a third decade and flip-flops F1000, F2000, F4000 and F8000 constitute a fourth decade. It will be understood more or less decades may be used, depending on the number of digits of the decimal number which are desired to be counted.

Each of the flip-flops shown is identical to the flip-flop 10 and thus has the same terminals. Referring to FIG. 3, there is shown a flip-flop as depicted in FIG. 2 with the terminals heretofore mentioned shown thereon. Thus each flip-flop has three bottom terminals A, P and C, two side terminals X and Y and four upper terminals R, T, S and B. The terminal T of each flip-flop is parallelly connected together to a common junction T′. The terminal R of each flip-flop is also parallelly connected together to a common terminal R′. Each terminal B is connected in parallel to a common output terminal B′. The parallel interconnections of the terminals T, B and R of the flip-flops are only shown with respect to the first flip-flop of each decade in order to avoid excessive interconnection lines in the logic diagram. It will be understood, however, that when a signal is applied to a common terminal R′ and T′ that the signal is applied to all flip-flops and when a low potential appears at the common terminal B′, all flip-flops are in the 0 state and hence the logic circuit is at the zero count condition.

The logic circuit includes input terminals S1, S2, S4 and S8 connected to terminal A for their respective flip-flops in the first decade. A binary signal representative of a decimal digit applied to the terminals S1, S2, S4 and S8 will cause their associated flip-flops to assume the binary condition representative of the decimal digit when a trigger pulse appears on the terminal T′. For transferring the first digit representation from the first decade to the second decade, the terminal Y of the flip-flop F1 is connected to the terminal A of the flip-flop 10 as are the same terminals interconnected for flip-flops F2 and F20, F4 and F40 and F8 and F80. Similarly the terminal Y of each of the flip-flops in the second decade is connected to terminal A of their respective flip-flops in the third decade while the terminal Y of the flip-flops in the third decade is connected to the terminal A of their respective flip-flops in the fourth decade. With the above interconnections the flip-flops will function as a shift register to be caused to assume a binary condition in each decade representative of the digit in a decimal number with the fourth decade representing the most significant digit of the decimal number (the thousands digit); the third decade, the lesser significant (the hundreds digit); the second decade (the tens digit); and the first decade (the units digit).

With all the flip-flops of the logic circuit being in the 0 state, the first pulse on the terminal T′ will cause the first decade to assume the condition of the input terminals S1, S2, S4 and S8. If the digit is 5, the binary representation is 0101 and S1 and S4 will have a high potential and S2 and S8 will have a low potential. Thus when the pulse occurs on the terminal T′, flip-flops F1 and F4 will be changed to the 1 state and F2 and F8 will remain in the 0 state. In the other decades, all flip-flops are in the 0 state and hence will so remain. After the pulse on the terminal T′ the terminals S1, S2, S4 and S8 will assume the representation of the next (2nd) digit of the decimal number and when the second pulse is applied to the terminal T′, the second decade will assume the condition of the first decade (F10 and F40 will change to the 1 state and F20 and F80 remain in the 0 state) while the first decade assumes a condition corresponding to the representation of the number on the leads S1, S2, S4 and S8. The two subsequent number representations on the leads S1, S2, S4 and S8 will be entered into the first decade with the application of the pulses on the trigger terminal T′. Without the application of a negative pulse on the terminal T′, the condition of the leads S1–S8 will not affect the condition of the flip-flops and thus whether the flip-flop functions as a shift register or not is dependent upon the appearance of the pulses in the terminal T′. After the decimal number has been entered into the system digit by digit, then further pulses on the common terminal T′ do not occur. It will thus be understood that pulses appear on the terminal T′ only when it is desired to accept the signal on the leads S1–S8 and cause the logic circuit to function as a shift register.

With the flip-flops having assumed the condition of the decimal number, the logic circuit will then be caused to function as a down counter by a high positive voltage being applied to the common terminal P′. It is directly connected in parallel only to the terminals P of flip-flops F1, F10, F100, F1000, F4, F40, F400 and F4000. The terminal P of the flip-flops F2, F20, F200 and F2000 are each connected to the output of an AND gate, there being an AND gate for each and denoted F2A, F20A, F200A and F2000A respectively while the common terminal P′ is connected in parallel to one of the two inputs of each of the AND gates. The other input of each AND gate is connected to the output of a three input OR gate, there being one OR gate for each AND gate with the OR gates being identified by the reference characters F2R, F20R, F200R and F2000R. In the first decade, one input of the OR gate F2R is connected to terminal Y of flip-flop F4, another input is connected to terminal Y of flip-flop F8 and the remaining input is connected to terminal Y of flip-flop F2. The other OR gates have their inputs similarly connected to the corresponding flip-flops in their respective decades.

The terminal P of each of the flip-flops F8, F80, F800 and F8000 is each connected to the output of an AND gate, denoted F8A, F80A, F800A and F8000A with each AND gate having three inputs. Referring to the gate F8A, one input is connected to terminal X of flip-flop F2, another is connected to terminal X of flip-flop F4 and the remaining input is connected to the common terminal P′. The AND gates F80A, F800A and F8000A are similarly connected to corresponding terminals of the flip-flops in their decade and in parallel to the common terminal P′.

It will be understood from the above that the flip-flops directly connected to the common terminal P′, namely, F1, F10, F100, F1000, F4, F40, F400 and F4000 will have the potential of the terminal P′ applied to their terminal P simultaneously with the potential appearing at the common terminal P′. The flip-flops F2, F20, F200 and F2000 will only have a high positive potential on their terminal P when it appears at the terminal P′ and also when there is a high positive potential (referring to the flip-flop F2) at least one of the terminals Y of F2, Y of F4 and Y of F8. In the absence of one of these conditions, the potential on the point P of the flip-flop F2 will be low and hence incapable of changing its state. Thus even when there is a high potential at the terminal P′, flip-flop F2 can only change its state when at least one of the flip-flops F2, F4 and F8 is in the 1 state.

The terminal P of the flip-flop F8 will only have a high potential thereon when the common terminal P′ has a high positive potential and both the terminal X of F2 and terminal X of F4 also have a high positive potential, i.e. are in the 0 state. Thus the flip-flop F8 can only change its state during the counting function when both flip-flops F2 and F4 are in the 0 state.

The input pulses which the logic circuit will count appear at an input terminal C′ which is connected only to the terminal C of the flip-flop F1. The terminals C of the flip-flops F2 and F8 are connected in parallel to the terminal X of flip-flop F1. The terminal C of flip-flop F4 is connected to the terminal X of flip-flop F2.

It will be understood with the above that each input pulse to be counted is only applied to the flip-flop F1 to cause it to change its state with each pulse. The flip-flop F4 will change its state only when the flip-flop F2 changes from the 0 to 1 state, i.e. a negative pulse appears on the terminal X of F1. The flip-flop F2 will change its state only when one of the flip-flops F2, F4 or F8 is in the 1 state, i.e. terminal Y thereof has a high positive potential and the flip-flop F1 changes from the 0 to the 1 state. The flip-flop F8 will change its state only when the flip-flops F2 and F4 are in the 0 state and the flip-flop F1 changes from the 0 to the 1 state. The above changes of course require that a high potential appear at the common terminal P′.

The flip-flops in the second decade (F10, F20, F40 and F80) are interconnected with each other in the same manner as the flip-flops in the first decade. However, the input pulse to the flip-flop F10 is from terminal X of the flip-flop F8 and thus the second decade will count a pulse only when the flip-flop F8 changes its state from 0 to 1. The flip-flops in the third decade (F100, F200, F400 and F800) and the flip-flops in the fourth decade (F1000, F2000, F4000 and F8000) are similarly connected with the input to the former being from terminal X of flip-flip F80 while the input to the latter is from terminal X of flip-flop F800.

Referring to the first decade consisting of flip-flops F1, F2, F4 and F8, each input pulse at terminal C′ causes the decade to down count one decimal digit. The flip-flops in the decade will assume the binary state set forth in the following chart, for each of the decimal numbers opposite thereto:

| Flip-Flop State | | | | Decimal Number |
|---|---|---|---|---|
| F8 | F4 | F2 | F1 | |
| 0 | 0 | 0 | 0 | [1] 10 |
| 1 | 0 | 0 | 1 | 9 |
| 1 | 0 | 0 | 0 | 8 |
| 0 | 1 | 1 | 1 | 7 |
| 0 | 1 | 1 | 0 | 6 |
| 0 | 1 | 0 | 1 | 5 |
| 0 | 1 | 0 | 0 | 4 |
| 0 | 0 | 1 | 1 | 3 |
| 0 | 0 | 1 | 0 | 2 |
| 0 | 0 | 0 | 1 | 1 |

[1] Or 0.

Thus assuming the condition of 0 or 10, an input pulse on the terminal C′ will cause flip-flop F1 to change its state to the 1 state which causes the terminal X to produce a negative pulse that is transferred to the flip-flops F2 and F8. Flip-flop F8 will change its state to the 1 state because a negative pulse appears on its terminal C by reason of flip-flop F1 being set to the 1 state and the flip-flops F2, F4 being in the 0 state and terminal P′ being positive. As the flip-flops F2, F4 and F8 are all in the 0 state when the pulse appears at terminal X of F1, a positive potential does not appear on terminal P of flip-flop F2 and thus flip-flop F2 does not change its state. The flip-flop F4 does not change as the flip-flop F2 does not change.

With the next input pulse on terminal C′, flip-flop F1 changes to the 0 state producing a negative pulse on its Y terminal and a positive pulse on its X terminal. However, as previously pointed out, each flip-flop is unresponsive to a positive pulse and thus there will be no change in the other flip-flops of the decade. Moreover, though the terminal Y of flip-flop F1 is connected to the flip-flop F10, as there is no trigger signal on the terminal T, flip-flop F10 will be unaffected by the appearance of the negative pulse on its terminal A.

The next pulse causes the decade to assume a condition representative of the decimal number 8 and thus only flip-flop F1 changes from 1 to the 0 state. Flip-flops F2 and F8 will not change by reason of terminal X not producing a negative pulse and flip-flop F4 will not change as flip-flop F2 does not change.

The next input pulse causes the decade to assume a condition representative of the decimal number 7. Thus the flip-flop F1 changes to the 1 state producing a signal to the flip-flop F8 causing it to change to the 0 state as the AND gate F8A passes a high positive potential to its terminal P because flip-flops F2 and F4 are both in the 0 state. The flip-flop F2 will change its state to the 1 state as both AND gate F2*a* inputs are positive, one input being the positive potential from the flip-flop F8 through the OR gate F2R. The flip-flop F4 will change to the 1 state because the flip-flop F2 produces a negative pulse on its terminal X when it changes its state with the pulse being transmitted to the terminal C of flip-flop F4 to effect the change.

For the next pulse, decimal number 6, only the flip-flop F1 changes its state from 1 to 0 while for the next pulse, decimal number 5, on the input terminal C′, flip-flop F1 changes to the 1 state causing flip-flop F2 to change to its 0 state by reason of F4 supplying a positive potential on the second AND gate input through the OR gate F2R. Flip-flop F4 will not change its state as flip-flop F2 does not supply a negative pulse to its terminal C.

The subsequent input pulse, decimal number 4, only changes the state of flip-flop F1 to its 0 state. The next input pulse, decimal number 3, changes flip-flop F1 to the 1 state. Flip-flop F2 also changes to the 1 state as there is a positive potential through the OR gate F2R from terminal Y of flip-flop F4. Flip-flop F4 changes because flip-flop F2 changes from the 0 to the 1 state. Flip-flop F8 does not change because the AND gate input from terminal X of flip-flop F4 was not at high positive potential when the flip-flop F1 changed and produced the negative pulse.

The next input pulse, decimal number 2, only changes the state of flip-flop F1. The next input pulse, decimal number 1, changes the states of flip-flops F1 and F2 from 1 to 0 respectively, the latter by the OR gate F2R having a high potential from its own terminal Y. The next pulse, representing the decimal number 0 or 10, only changes flip-flop F1. At this condition, all flip-flops in the first decade are in the 0 state and the next pulses will cause repetition of the above cycle.

When the first decade repeats the cycle, and changes from the condition representing the decimal number 0 to the condition representing the decimal number 9, a negative pulse appears at the X terminal of flip-flop F8. The terminal C of flip-flop F10 is connected to receive this pulse. As the flip-flops in the second decade are interconnected in the same manner as the flip-flops of the first decade, the pulse from flip-flop F8 to flip-flop F10 constitutes the count input pulse to the second decade. The states of the flip-flops of the second decade will accordingly change for each input pulse from flip-flop F8 as do the flip-flops in the first decade.

The terminal X of flip-flop F80 is connected to the count input terminal C of flip-flop F100 and terminal X of flip-flop F800 is connected to the count input terminal C of flip-flop F1000. It will thus be appreciated that every time the second decade changes from a condition representing the decimal number 0 to the decimal number 9, that the third decade will shift its condition 1 decimal digit. Similarly every time the third decade shifts its condition from the condition representing the decimal number 0 to the condition representing the decimal number 9, the fourth decade will change its condition 1 decimal digit.

Continuous input pulses on the terminal C′ will accordingly cause changes in state of the flip-flop until the number of input pulses received by the logic circuit is equal to the condition which represents the initial number stored in the logic circuit when it functioned as a shift register. At this time each of the decades will represent the 0 condition and there will appear on the common terminal B′ a change in voltage from a high to a low value. It will be understood that if any one of the flip-flops is in the 1 state that the potential at the terminal B′ will be positive and thus only at the condition of the flip-flop representing the 0 decimal number will the common terminal T′ be at a low potential. The signal indicating the zero count condition may be employed to actuate other mechanisms which may stop the supply of input pulses on the terminal C′, actuate a tape reader, etc.

While the logic circuit has heretofore been explained with respect to the assumption of a condition representing a number by means of the input at the terminals S1, S2, S4 and S8, it will be understood that the circuit may be caused to assume a condition representative of a four digit decimal number by applying the proper potentials on the terminal S of each flip-flop. This may be achieved by the use of plural position switches as is well known in the art.

If desired to cause the logic circuit to assume a zero count condition a positive pulses is applied to the terminal R′ to which all R terminals of the flip-flops are interconnected.

It will accordingly be understood that there has been disclosed a flip-flop in which particular combinations of signals are required in order for it to change its state. A plurality of the flip-flops are interconnected together to form a logic circuit and the circuit may be caused to function as either a shift register or a down counter. When the circuit is desired to function as a shift register, the command signal is either a high or low potential applied to each flip-flop from an input or selected other flip-flops and the effectuating signal is a negative pulse applied to all flip-flops. In the absence of the negative pulse, the circuit will not function and the high and low potentials have no effect. When the circuit is desired to function as a decimal coded binary down counter, a high positive potential must be simultaneously applied with a negative pulse to the lowest order flip-flop to have it change its state. The high enabling potential is applied to some flip-flops throughout the duration that the circuit functions as a counter and to others at only selected conditions of some of the flip-flops. By so interconnecting the flip-flops, they are immune, when functioning as a shift register, to signals carried on the counter connections while when functioning as a counter, the flip-flops are immune to changes carried over the shift register interconnections. It will be further appreciated that each flip-flop in the logic circuit may be separately set to a desired state, without its change effecting the states of the other flip-flops even though they are interconnected, easily and effectively by having a low potential on the terminal P′ and by applying the signal on the terminal S.

Variations and modifications may be made within the scope of the claims and portions of the improvements may be used without others.

I claim:

1. A logic circuit comprising a plurality of flip-flops with each flip-flop having a 0 and a 1 state, first means interconnecting at least four flip-flops to form a first binary coded decade counter for achieving a condition representative of a decimal digit, second means interconnecting at least four flip-flops to form a second binary coded decade counter for achieving a condition representative of a decimal digit, means connecting the flip-flops of the first decade to the corresponding flip-flops of the second decade to form a shift register, input shift register means connected to each of the flip-flops of the first decade, a copy command terminal connected to all of the flip-flops for applying a simultaneous signal to each, input count means connected to at least the initial flip-flop of the first decade and count command means connected to all of the flip-flops for supplying a signal simultaneously to all.

2. The invention as defined in claim 1 in which the first means includes connections between the initial flip-flop and the second and fourth flip-flops of the first decade for enabling a change of state of the second and fourth flip-flops only when the initial flip-flop changes from the 0 to the 1 state.

3. The invention as defined in claim 1 in which the first means includes means interconnecting the second, third and fourth flip-flops for enabling a change of state of the second flip-flop only when at least one of the second, third and fourth flip-flops is in the 1 state.

4. The invention as defined in claim 3 in which the means interconnecting the second, third and fourth flip-flop includes an AND gate having a pair of inputs and an output, an OR gate having an output and a plurality of inputs, said count command means being connected to an input of the AND gate, said output of said OR gate being connected to the other input of the AND gate and said OR gate inputs being connected to the second, third and fourth flip-flops of the decade.

5. The invention as defined in claim 1 in which the first means includes means interconnecting the third flip-flop with the second flip-flop for enabling a change of state of the third flip-flop only when the second flip-flop changes from the 0 state to the 1 state.

6. The invention as defined in claim 1 in which the first means includes an AND gate having a plurality of inputs and an output connected to the fourth flip-flop, one of said inputs being connected to the count command means, another of said inputs being connected to the second flip-flop and a third of said inputs being connected to the third flip-flop for enabling a change of state of the fourth flip-flop only when the second and third flip-flops are in the 0 state.

7. The invention as defined in claim 1 in which the second decade has an initial flip-flop and means interconnecting the fourth flip-flop of the first decade with the initial flip-flop of the second decade, whereby said first decade functions as a unit decade and said second decade functions as a tens decade.

8. The invention as defined in claim 1 in which the logic circuit includes a zero count terminal, each of said flip-flops includes a sense point identical to each and means interconnecting each sense point in parallel to the zero count terminal.

9. The invention as defined in claim 1 in which the logic circuit includes a reset terminal, each of said flip-flops has a trigger point identical to each and means connecting the trigger points in parallel to the reset terminal to enable a signal applied to the terminal to reset all flip-flops to the same state.

10. The invention as defined in claim in which each flip-flop comprises a first and second transistor, each of said transistors having a trigger point and a sense point, means interconnecting the trigger point of the first transistor to the sense point of the second transistor and the trigger point of the second transistor to the sense point of the first transistor, whereby one of the transistors is conductive at all times during energization with conduction of the first transistor constituting the 1 state of the flip-flop and conduction of the second transistor constituting the 0 state of the flip-flop, means connecting a command terminal and a copy terminal to said trigger points to cause the flip-flop to assume a state related to the signal applied to the command terminal upon application of a trigger pulse to the trigger terminal and means connecting a counting terminal and a count terminal to said trigger points to cause said flip-flop to change its state when a selected signal is applied to the counting terminal and a pulse is applied to the count terminal.

References Cited

UNITED STATES PATENTS

| | | | |
|---|---|---|---|
| 2,819,840 | 1/1958 | Huntley | 328—37 |
| 3,056,044 | 9/1962 | Kroos | 307—88.5 |
| 3,091,737 | 5/1963 | Tellerman et al. | 307—88.5 |
| 3,102,208 | 8/1963 | Reach | 307—88.5 |
| 3,308,337 | 3/1967 | Crowther | 328—51 X |

ARTHUR GAUSS, *Primary Examiner.*

JOHN S. HEYMAN, *Examiner.*

J. S. HEYMAN, *Assistant Examiner.*